United States Patent [19]

Jin et al.

[11] Patent Number: 5,631,800
[45] Date of Patent: May 20, 1997

[54] APPARATUS FOR DETERMINING OPERATING STATE OF COOLING FAN

[75] Inventors: Sung-kon Jin, Anyang; Seung-hwe Hwang, Seoul, both of Rep. of Korea

[73] Assignee: SamSung Electronics Co., Ltd., Kyungki-do, Rep. of Korea

[21] Appl. No.: 594,441

[22] Filed: Jan. 31, 1996

[30] Foreign Application Priority Data

Feb. 24, 1995 [KR] Rep. of Korea .................. 95-3701

[51] Int. Cl.$^6$ ................................................. H02H 5/04
[52] U.S. Cl. ........................................ 361/103; 364/484
[58] Field of Search .......................... 361/52–54, 25, 361/103, 115, 18; 324/160, 520, 753, 207.25; 364/481, 487, 494, 557, 559, 484

[56] References Cited

U.S. PATENT DOCUMENTS

| | | | |
|---|---|---|---|
| 5,130,933 | 7/1992 | Kitano | 364/487 |
| 5,469,320 | 11/1995 | Walker et al. | 361/103 |

*Primary Examiner*—Jeffrey A. Gaffin
*Assistant Examiner*—Ronald W. Leja
*Attorney, Agent, or Firm*—Robert E. Bushnell, Esq.

[57] ABSTRACT

An apparatus for detecting an operating state of a cooling fan in a computer system protects the computer system from damage due to excessive heat by preventing further operation of the computer system when the cooling fan is operating in an abnormal condition. The apparatus includes a pulse generating circuit for generating pulses in accordance with the motion of a cooling fan while the cooling fan revolves. A per revolution pulse generating circuit generates a pulse signal for every revolution of the cooling fan in accordance with the pulse signals provided from the pulse generating circuit. A dividing counter circuit outputs pulse signals having a specified period set in accordance with incoming data and reference clock signals. A revolution state determining circuit sets a time period for checking the operating state of the cooling fan in accordance with the pulse signals provided from the dividing counter circuit. The revolution state determining circuit determines the operating state of the cooling fan based on the pulse signals provided from the per revolution pulse generating circuit during the set time period, and outputs signals for controlling the interrupt state of the computer system when the cooling fan is operating in an abnormal state.

16 Claims, 6 Drawing Sheets

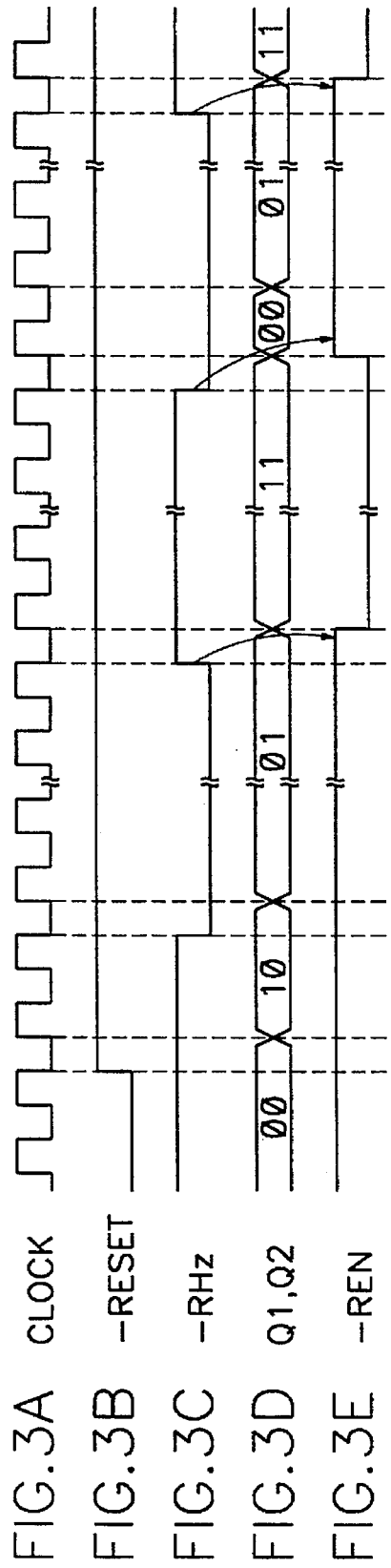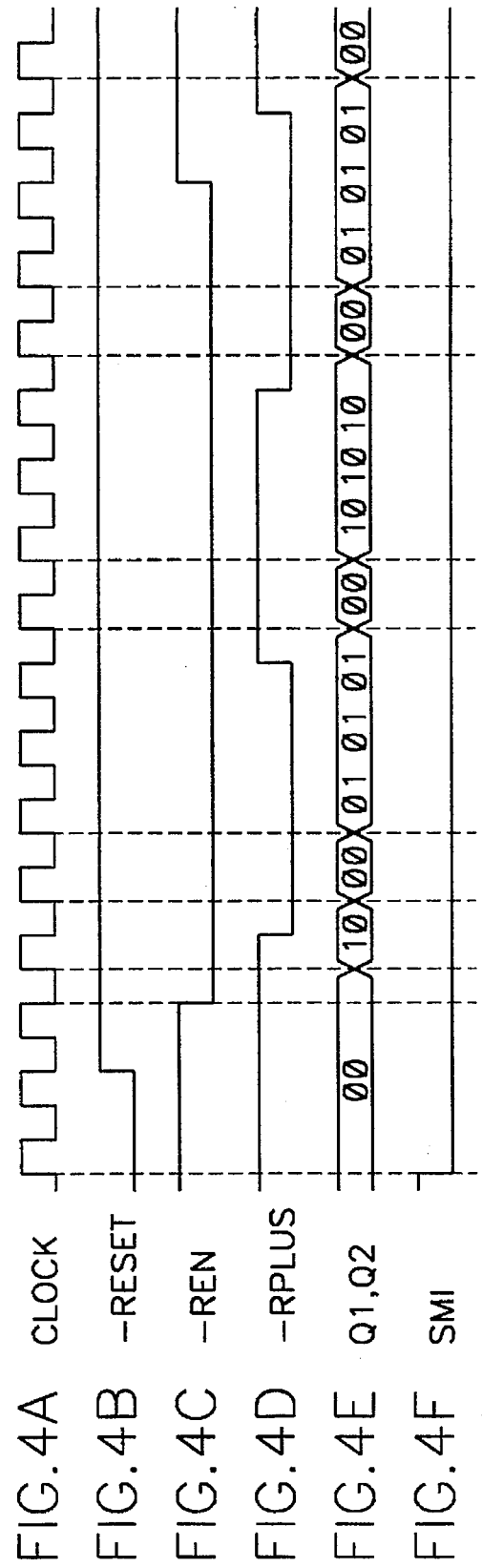

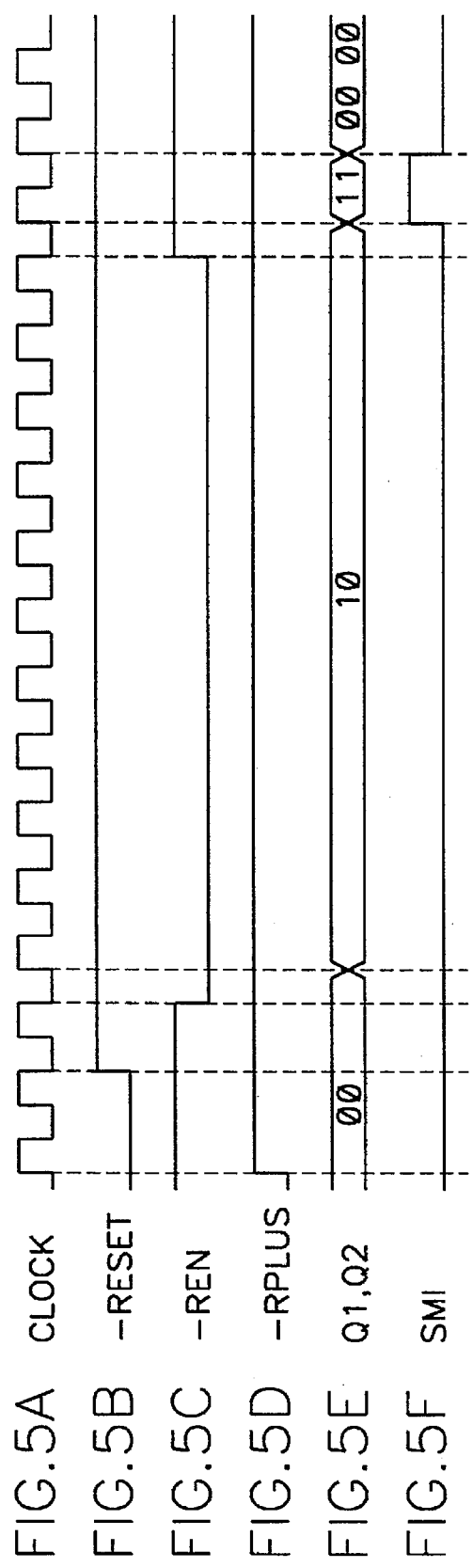

APPARATUS FOR DETERMINING OPERATING STATE OF COOLING FAN

CROSS-REFERENCE TO RELATED APPLICATIONS

This application makes reference to, incorporates the same herein, and claims all benefits accruing under 35 U.S.C. §119 from an application for *Apparatus For Determining Operating State Of Cooling Fan* earlier filed in the Korean Industrial Property Office on 24 Feb. 1995 and there assigned Ser. No. 3701/1995.

BACKGROUND OF THE INVENTION

The present invention relates to an apparatus for determining the operating state of a cooling fan, and more particularly, to an apparatus for determining the operating state of a cooling fan used to dissipate heat generated from the operation of a computer system.

Generally, when a computer system is operated, heat is generated from the internal components of the computer. As the operating frequency increases, the amount of heat that is generated and released also increases.

Due to the heat that is generated and released during the operation of a computer system, the internal components of the computer can be adversely affected. Accordingly, the life expectancies of the components may be shortened, and the normal operating abilities of the computer system impeded. In a worse case scenerio, the internal components can be damaged due to the heat, thereby rendering the computer system wholly inoperable. Therefore, in order to prevent problems caused by excessive heat, a cooling fan is provided to forcibly discharge the internally generated heat and thereby lower the temperature of the computer system. Conventionally, there has been no device for detecting the operating state of the cooling fan in the computer system. If the cooling fan begins to operate in an abnormal condition, or ceases to operate at all, then the internally generated heat cannot be adequately discharged. Therefore, the computer system is at risk of malfunctioning, or incurring serious damage due to the excessive heat.

SUMMARY OF THE INVENTION

Accordingly, it is an object of the present invention to provide an apparatus for accurately detecting the operating state of a cooling fan used in a computer system to eliminate internally generated heat.

It is another object to provide an apparatus for detecting the operating state of a cooling fan in a computer system that prevents the computer system from being damaged due to excessive heat.

It is still another object to provide an apparatus for detecting the operating state of a cooling fan in a computer system that informs a user if the operating state of the cooling fan becomes abnormal.

It is yet another object to provide an apparatus for detecting the operating state of a cooling fan in a computer system that prevents further operation of the computer system when the operating state of the cooling fan becomes abnormal.

To achieve these and other objects, the present invention provides an apparatus for detecting an operating state of a cooling fan in a computer system. The apparatus includes a pulse generating circuit for generating pulse signals in accordance with the movement of a cooling fan while the cooling fan rotates. A per revolution pulse generating circuit generates a pulse signal for every revolution of the cooling fan in accordance with the pulse signals provided from the pulse generating circuit. A dividing counter circuit outputs pulse signals having a predetermined period set in accordance with externally received data and reference clock signals. A revolution state determining circuit sets a unit time period for checking the operating state of the cooling fan in accordance with the pulse signals provided from the dividing counter circuit. The revolution state determining circuit determines the operating state of the cooling fan based on the pulse signals provided from the per revolution pulse generating circuit during the unit time period, and outputs signals for controlling the interrupt state of the computer system when the cooling fan is operating in an abnormal state. Accordingly, further operation of the computer system is prevented when the cooling fan is operating in the abnormal state.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 3A through 3E are timing charts for a first section of a revolution state determining circuit for the cooling fan constructed according to the principles of the present invention;

FIGS. 4A through 4F are timing charts for a second section of the revolution state determining circuit according to the present invention during normal operation; and FIGS. 5A through 5F are timing charts for the second section of the revolution state determining circuit according to the present invention during abnormal operation.

DETAILED DESCRIPTION OF THE INVENTION

Figure 1:
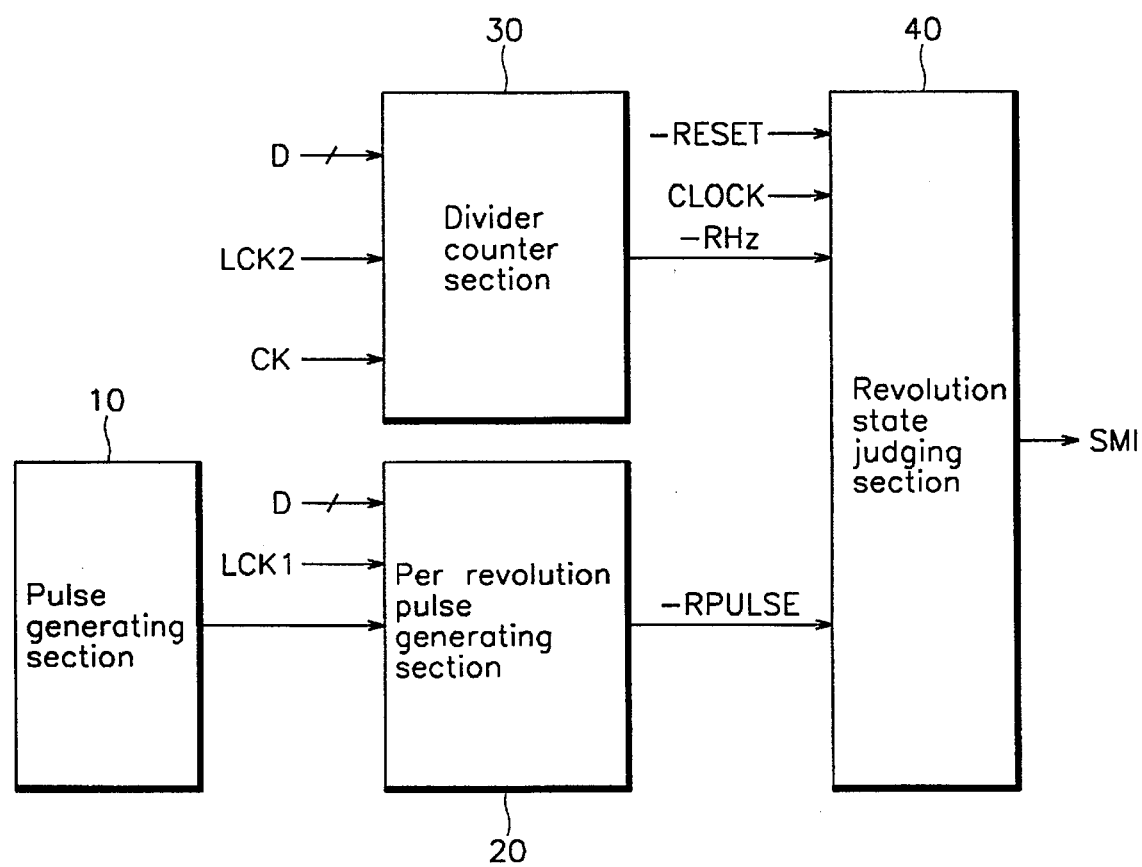
FIG. 1 is a block diagram showing the apparatus for determining the operating state of a cooling fan in accordance with the principles of the present invention.

Turning now to the drawings and referring to FIG. 1, the apparatus for determining the operating state of a cooling fan according to the principles of the present invention is shown. The apparatus of FIG. 1 includes a pulse generating circuit 10 for generating pulses in accordance with the movement of a cooling fan while the cooling fan rotates. A per revolution pulse generating circuit 20 generates a pulse signal for every revolution of the cooling fan in accordance with the pulse signals provided from pulse generating circuit 10. A dividing counter circuit 30 outputs pulse signals having a predetermined period set in accordance with incoming data and reference clock signals CK. A revolution state determining circuit 40 sets a unit time period for checking the operating state of the cooling fan in accordance with the pulse signals provided from dividing counter circuit 30. Revolution state determining circuit 40 determines the operating state of the cooling fan based on the pulse signals provided from per revolution pulse generating circuit 20 during the unit time period, and outputs signals for controlling the interrupt state of a computer system when the cooling fan is operating in an abnormal condition. Here, an abnormal condition is a situation where the cooling fan is either rotating at a speed that is insufficient to properly expel the internally generated heat of the computer system, or is not rotating at all. Predetermined operation parameters representative of the rotational speed of the cooling fan that are chosen by the manufacturer can be used to determine whether an abnormal condition exists.

Figure 2A:
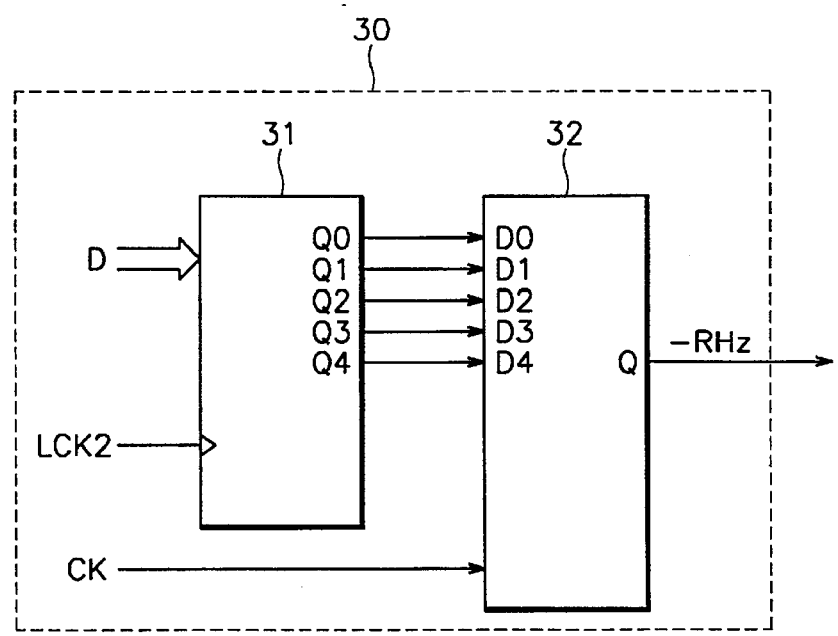
FIGS. 2A through 2C illustrate the circuits of the apparatus constructed according to the principles of the present invention.
Figure 2A:
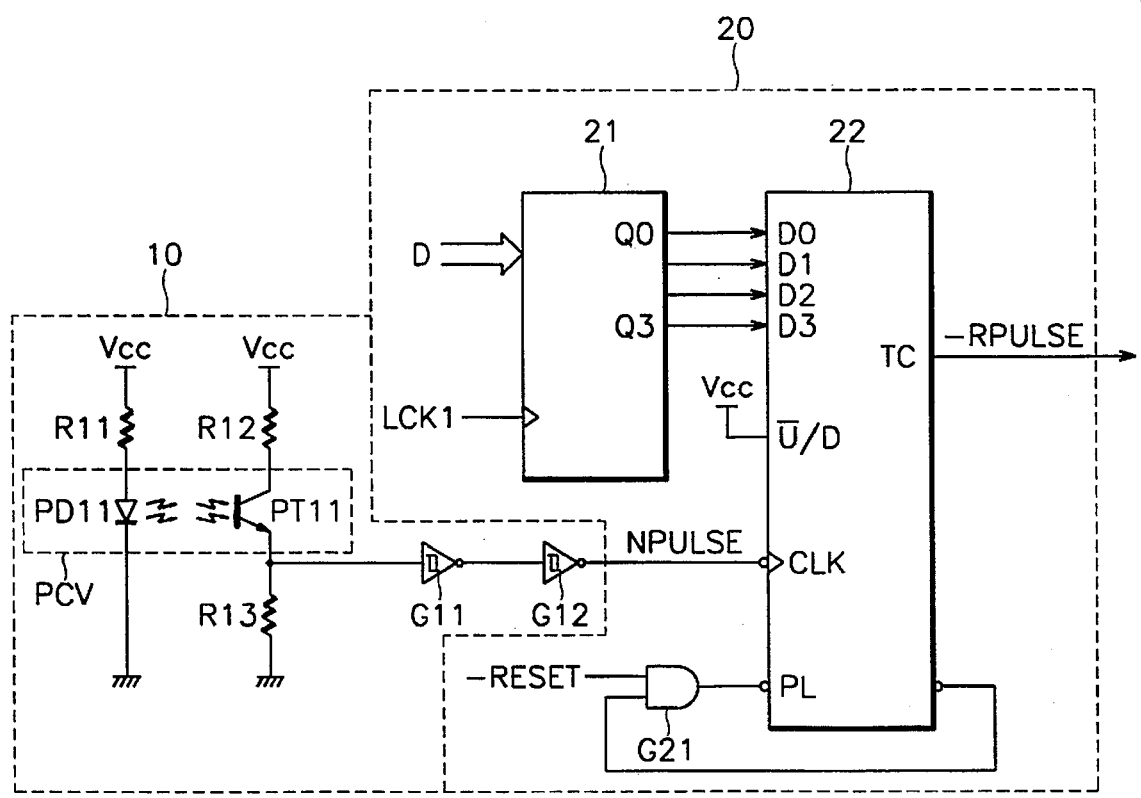

Referring to FIG. 2A, pulse generating circuit 10 includes a resistor R11 having a first terminal connected to a power source Vcc and a second terminal connected to an anode of a photo diode PD11. The cathode of photo diode PD11 is connected to a ground potential. A resistor R12 has a first terminal connected to power source Vcc and a second terminal connected to a collector terminal of a photo transistor PT11. A photo coupler PC1 is made up of photo diode PD11 and photo transistor PT11. The blades of a cooling fan 15 are interposed between photo diode PD11 and photo transistor PT11. A resistor R13 has a first terminal connected to an emitter terminal of photo transistor PT11 and a second terminal connected to a ground potential. An invertor G11 has an input terminal connected to the first terminal of resistor R13 and an output terminal connected to an input terminal of an invertor G12.

Per revolution pulse generating circuit 20 includes a latch 21 for receiving external input signals D through an input terminal in accordance with clock signals LCK1 received through a clock terminal. A counter 22 has input terminals D0–D3 connected to output terminals Q0–Q3 of latch 21, and a clock terminal CLK connected to an output terminal of invertor G12 of pulse generating circuit 10. An AND gate G21 has a first input terminal connected to receive reset signals -RESET, and a second input terminal connected to a ripple counter terminal -RC of counter 22. An output terminal of AND gate G21 is connected to a pre-load terminal PL of counter 22.

Dividing counter circuit 30 includes a latch 31 for receiving external input signals D through an input terminal, and for receiving clock signals LCK2 through a clock terminal. A counter 32 has input terminals D0–D3 connected to output terminals Q0–Q3 of latch 31, and a clock terminal CLK for receiving reference clock signals CK.

Figure 2B:
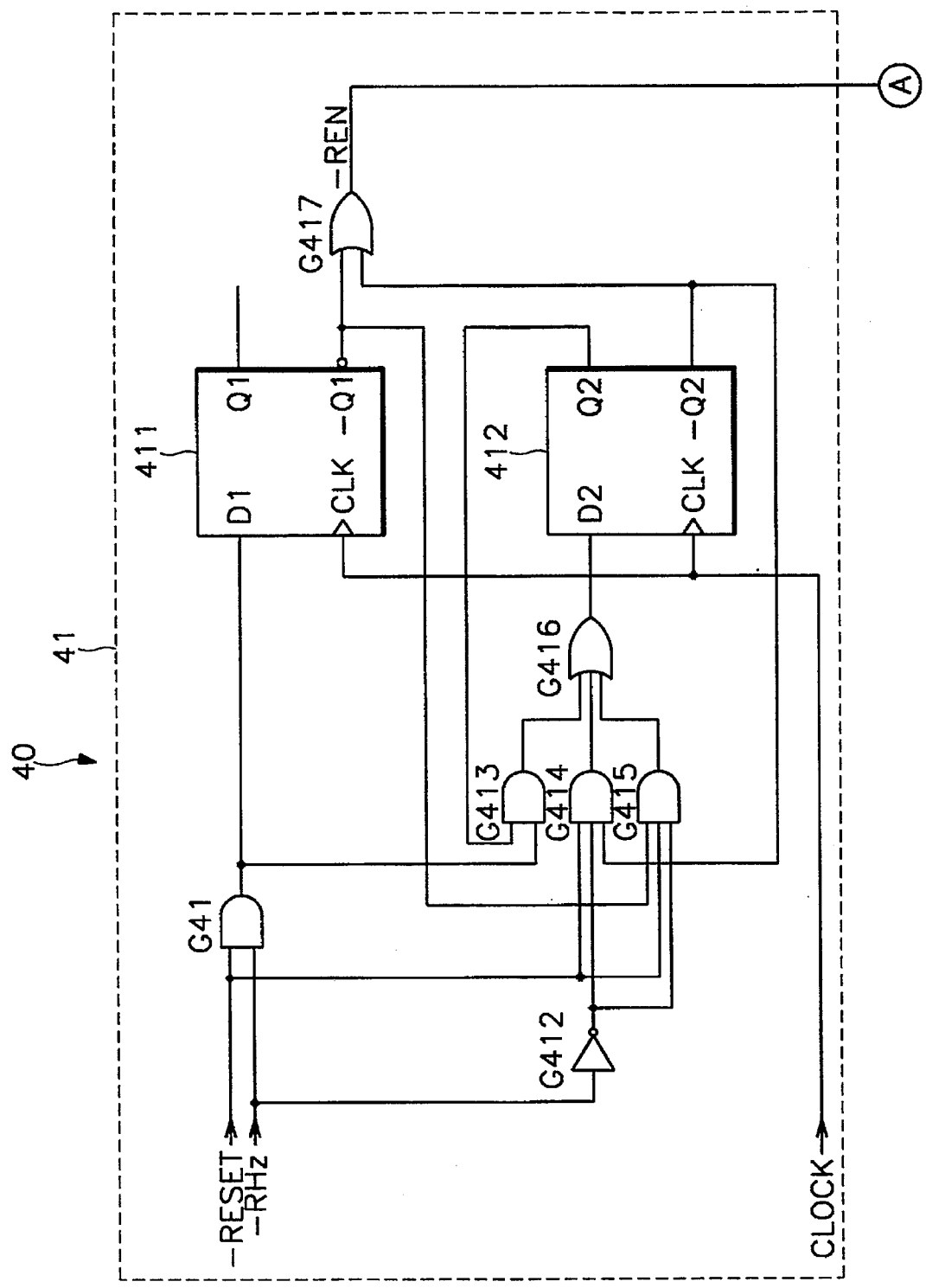
Figure 2C:
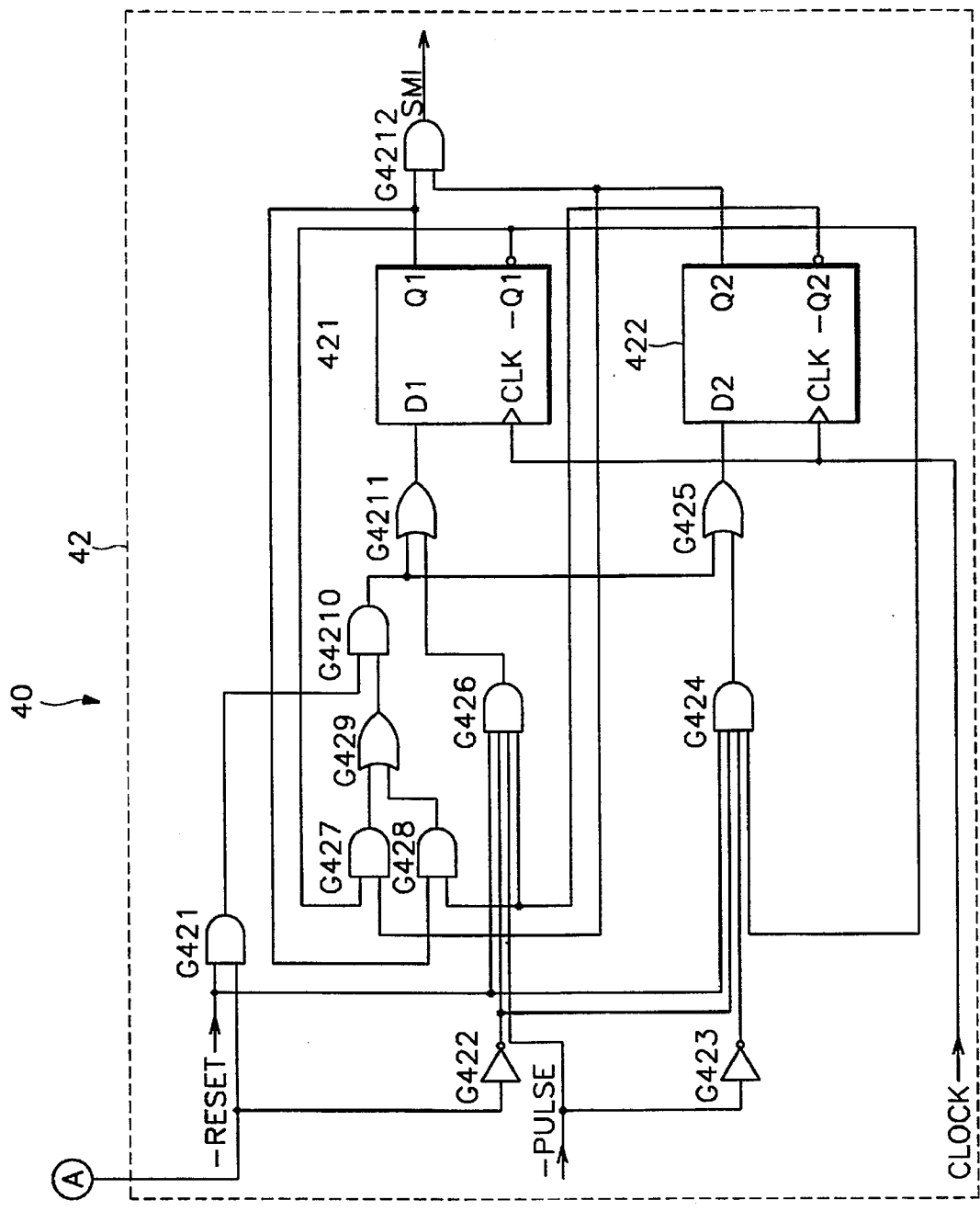

As shown in FIGS. 2B and 2C, revolution state determining circuit 40 includes a first section 41 for setting a unit time period to determine the operating state of cooling fan 15, and a second section 42 for determining the operating state of cooling fan 15 during the unit time period set by first section 41.

First section 41 of revolution state determining circuit 40 shown in FIG. 2B includes an AND gate G411 having a first input terminal connected to receive reset signals -RESET, and a second input terminal connected to receive output signals -RHz from an output terminal Q of dividing counter circuit 30. An invertor G412 has an input terminal connected to output terminal Q of counter 32 of dividing counter circuit 30. An AND gate G413 has one input terminal connected to an output terminal of AND gate G411. An AND gate G414 has a first input terminal connected to receive the reset signals -RESET, and a second input terminal connected to an output terminal of invertor G412. An AND gate G415 has one input terminal connected to receive reset signals -RESET, and another input terminal connected to the output terminal of invertor G412. An OR gate G416 has first through third input terminals connected to output terminals of AND gates G413–G415, respectively. A first D flip-flop 411 has an input terminal D1 connected to the output terminal of AND gate G411 and a clock terminal CLK connected to receive clock signals CLOCK. First D flip-flop 411 also has an inverting output terminal -Q1 connected to yet another input terminal of AND gate G415. A second D flip-flop 412 has an input terminal D2 connected to an output terminal of OR gate G416 and a clock terminal CLK connected to receive clock signals CLOCK. Second D flip-flop 412 also has an output terminal Q2 connected to a first input terminal of AND gate G413, and an inverting output terminal -Q2 connected to a third input terminal of AND gate G414. An OR gate G417 has first and second input terminals connected to inverting output terminals -Q1 and -Q2 of first and second D flip-flops 411 and 412, respectively.

Second section 42 of revolution state determining circuit 40 shown in FIG. 2C includes an AND gate G421 having a first input terminal connected to receive reset signals -RESET, and a second input terminal connected to receive output signals -REN from OR gate G417 of the first section 41 of revolution state determining circuit 40 shown in FIG. 2B. An invertor G422 has an input terminal connected to receive the output signals -REN from OR gate G417 of the first section 41. An invertor G423 has an input terminal connected to receive output signals RPULSE from counter 22 of per revolution pulse generating circuit 20. An AND gate G424 has a first input terminal connected to receive reset signals -RESET, a second input terminal connected to an output terminal of invertor G422, and a third input terminal connected to an output terminal of invertor G423. An OR gate G425 has one input terminal connected to an output terminal of AND gate G424. A second D flip-flop 422 has an input terminal D2 connected to an output terminal of OR gate G425, and a clock terminal CLK connected to receive clock signals CLOCK. An AND gate G426 has a first input terminal connected to receive reset signals -RESET, a second input terminal connected to an output terminal of invertor G422, a third input terminal connected to receive output signals -RPULSE from counter 22 of per revolution pulse generating circuit 20, and a fourth input terminal connected to an inverting output terminal of second D flip-flop 422. An AND gate G427 has one input terminal connected to an output terminal Q2 of second D flip-flop 422. An AND gate G428 has one input terminal connected to the inverting output terminal -Q2 of second D flip-flop 422. An OR gate G429 has first and second input terminals connected to output terminals of AND gates G427 and G428, respectively. An AND gate G4210 has a first input terminal connected to an output terminal of AND gate G421, a second input terminal connected to an output terminal of OR gate G429, and an output terminal connected to another input terminal of OR gate G425. An OR gate G4211 has a first input terminal connected to an output terminal of AND gate G4210 and a second input terminal connected to an output terminal of AND gate G426. A first D flip-flop 421 has an input terminal D1 connected to an output terminal of OR gate G4211, and a clock terminal CLK connected to receive clock signals CLOCK. First D flip-flop 421 also has an output terminal Q1 connected to another input terminal of AND gate G428, and an inverting output terminal -Q1 connected to another input terminal of AND gate G427 and to a fourth input terminal of AND gate G424. An AND gate G4212 has first and second input terminals connected to output terminals Q1 and Q2 of first and second D flip-flops 421 and 422, respectively, and an output terminal for outputting interrupt signals SMI.

The operation of the apparatus of the present invention will now be described with reference to FIGS. 2A through 5F.

First, when cooling fan 15 revolves during operation of the computer system, photo coupler PC1 of pulse generating circuit 10, which is formed to detect the blades of cooling fan 15, varies its operating state in accordance with the revolutions of cooling fan 15. That is, when light rays emitted from photo diode PD11 of photo coupler PC1 are shielded by the blades of cooling fan 15, photo transistor PT11 of photo coupler PC1 is maintained in an off state. On the other hand, when the light rays are transmitted from photo diode PD11 to photo transistor PT11 between the blades of cooling fan 15, photo transistor PT11 is switched to an on state.

Therefore, when cooling fan 15 is driven during operation of the computer system, photo coupler PC1 of pulse generating circuit 10 repeatedly turns on and off in accordance with the positions of the blades of cooling fan 15, thereby generating pulse signals having a period corresponding to the rotating speed of cooling fan 15. That is, pulse signals NPULSE are output from photo coupler PC1 through invertors G11 and G12 having Schmidt trigger characteristics, and are provided to clock terminal CLK of counter 22 of per revolution pulse generating circuit 20. Per revolution pulse generating circuit 20 generates one pulse for each complete revolution of cooling fan 15 so that the operating state of cooling fan 15 can be determined.

The number of blades on cooling fan 15 corresponds to the number of input terminals D0–D3 of controller 22, so that relevant data can be provided from output terminals Q0–Q3 of latch 21 in accordance with clock signals LCK1 applied to the clock terminal. The data output lines extending from latch 21, which also correspond to the number of blades on cooling fan 15, are connected to input terminals D0–D3 of counter 22, and a high level power source Vcc is provided to an up-down terminal U/D of counter 22. Accordingly, counter 22 operates as a down counter, rather than an up counter.

Counter 22 executes a down counting operation in accordance with the output signals provided from latch 21 and pulse signals NPULSE provided from pulse generating circuit 10. Thus, if the count value is "0", an pulse signal -RPULSE having a specific period is output from terminal TC of counter 22, while an inverted pulse signal is output from ripple counter terminal -RC. The inverted pulse signal output from ripple counter terminal -RC is provided to one input terminal of AND gate G21 and the reset signals -RESET are provided to the other input terminal. Each time the count value becomes "0", a low level logic signal "L" is input to pre-load terminal PL of counter 22. Therefore, each time the count value become "0", counter 22 is loaded with the output data from latch 21 to execute a new down counting operation.

The operation of counter 22 is executed in the following manner. Each time a number of counts equal to the number of blades on cooling fan 15 is performed, a pulse signal -RPULSE is output from terminal TC. Therefore, for each revolution of cooling fan 15, one pulse is generated and provided to revolution state determining circuit 40.

Dividing counter circuit 30 divides reference clock signals CK applied to clock terminal CLK of counter 32 by the data provided from latch 31 in accordance with clock signals LCK2, thereby generating pulse signals -RHZ having a specified period. Therefore, during the period of pulse signal -RHZ, which is generated by the operations of latch 31 and counter 32, the operating state of cooling fan 15 of the computer system can be evaluated and determined.

Latch 31 receives data signals D in accordance with clock signals LCK2, and provides the data signals D through output terminals Q0–Q3 to input terminals D0–D3 of counter 32, which is a programmable dividing counter. Counter 32 counts downwardly sequentially in accordance with reference clock signals CK applied to clock terminal CLK. Counter 32 then provides pulse signals -RHZ through output terminal Q to revolution state determining circuit 40 in correspondence with the specified period. Thus, the relevant pulse signals are provided to revolution state determining circuit 40 by the operations of per revolution pulse generating circuit 20 and dividing counter circuit 30. Revolution state determining circuit 40 then makes a determination on the rotating condition of cooling fan 15 of the computer system, so that the user can recognize the operating state of cooling fan 15.

First section 41 of revolution state determining circuit 40 operates based on pulse signals -RHZ provided from dividing counter section 30, and further based on externally provided clock signals CLOCK. First section 41 operates in the following manner.

Each time the logic state of pulse signal -RHZ output from dividing counter section 30 shifts from a low logic level "L" to a high logic level "H", the signal -REN output from OR gate G417 shifts logic states, so that the time period can be set for determining the operating state of cooling fan 15.

Referring now to FIGS. 3A–3E, timing operations for first section 41 will be explained. Clock signal CLOCK, as shown in FIG. 3A, is provided to clock terminals CLK of first and second D flip-flops 411 and 412. If reset signal -RESET for controlling the operation of first section 41 shifts from a low logic level "L" to a high logic level "H", as shown in FIG. 3B, then the signal -REN output from OR gate G417 shifts logic states, as shown in FIG. 3E, in accordance with the logic states of output terminals Q1 and Q2 of first and second D flip-flops 411 and 412, as shown in FIG. 3D, and in accordance with the pulse signals -RHZ output from dividing counter circuit 30, as shown in FIG. 3C. Accordingly, the signal -REN is provided to second section 42.

Each time the logic state of pulse signal -RHZ output from dividing counter circuit 30 shifts, first section 41 of revolution state determining circuit 40 shifts the logic state of output signal -REN, thereby setting the time period (or interval) for checking the operating state of cooling fan 15 of the computer system.

If first section 41 outputs the signal -REN to second section 42 in synchronization with pulse signal -RHZ provided from dividing counter circuit 30, as shown in FIGS. 3C and 3E, second section 42 makes a determination regarding the operating condition of cooling fan 15 within the set time period using pulse signal -RPULSE provided from per revolution pulse generating circuit 20 and reset signal -RESET.

Operation of second section 42 of revolution state determining circuit 40 will now be explained. When clock signal CLOCK is provided to clock terminals CLK of first and second D flip-flops 421 and 422, as shown in FIGS. 4A and 5A, and reset signal -RESET is shifted to a high logic level "H", as shown in FIGS. 4B and 5B, then the logic state of interrupt signal SMI output from AND gate G4212 can be shifted in accordance with the signal -REN output from first section 41 and pulse signal -RPULSE output from per revolution pulse generating circuit 20.

As shown in FIGS. 4A–4F, during the time period set by output signal -REN of first section 41, if pulse signal -RPULSE is provided from per revolution pulse generating circuit 20 at designated periods, then the interrupt signal SMI of second section 42 exhibits a low logic level "L", regardless of the state of output terminals Q1 and Q2 of first and second D flip-flops 421 and 422. That is, during the time period set by first section 41, if pulse signals -RPULSE are output in a timely manner from per revolution pulse generating circuit 20 in correspondence with rotations of cooling fan 15 of the computer system, then it is determined that the operating state of cooling fan 15 of the computer system is normal.

However, during the time period set by the output signal -REN of first section 41, if pulse signals -RPULSE are not output in a timely manner from per revolution pulse generating circuit 20, as shown in FIG. 5D, then interrupt signal SMI output from AND gate G4212 shifts to a high logic level "H", as shown in FIG. 5F, in accordance with the signals provided from output terminals Q1 and Q2 of first and second D flip flops 421 and 422, as shown in FIG. 5E. Therefore, if interrupt signal SMI output from second section 42 exhibits a high logic level "H", then the operation of the computer system is changed to an interrupt state.

Accordingly, if cooling fan 15 of the computer system operates in an abnormal manner, namely, if pulse signal -RPULSE provided from per revolution pulse generating circuit 20 is not output within the time period set by the output signal -REN of first section 41, or if pulse signal -RPULSE is not provided from per revolution pulse generating circuit 20 due to an interruption in the operation of cooling fan 15, then second section 42 of revolution state determining circuit 40 generates interrupt signal SMI to adjust the computer system to an interrupt state.

Therefore, when interrupt signal SMI output from AND gate H4212 shifts to a high logic level "H", the computer system shifts to an interrupt state. The current state of the computer system is then stored into an internal memory, and the computer system ceases to operate. Consequently, damage which is likely to occur due to continuous operation of the computer system in spite of the abnormal operating condition of the cooling fan can be prevented.

According to the present invention described above, damage and malfunctions caused by excessive operating heat of the computer system are prevented. For this purpose, if the cooling fan which forcibly discharges the internal heat of the computer system exhibits an abnormal operating condition, the computer system is shifted to an interrupt state, thereby protecting the internal components of the computer system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for determining an operating state of a cooling fan in a computer system, said apparatus comprising:

pulse generating means for generating pulses in accordance with movement of said cooling fan during rotation of said cooling fan;

per revolution pulse generating means for generating a pulse signal for each revolution of said cooling fan in response to said pulses generated by said pulse generating means;

dividing counter means for generating signals having a predetermined period, said predetermined period being set in accordance with input signals and reference clock signals received by said dividing counter means; and revolution state determining means for setting a unit time period for determining said operating state of said cooling fan in accordance with said signals generated by said dividing counter means, determining said operating state of said cooling fan based on outputs of said pulse signal provided from said per revolution pulse generating means during said unit time period, and for generating an interrupt signal to prevent further operation of said computer system when said operating state of said cooling fan is determined to be abnormal.

2. The apparatus as claimed in claim 1, wherein said pulse generating means comprises a photo coupler for generating and providing output of said pulses based on whether blades of said cooling fan allow light rays emitted from a light emitting unit of said photo coupler to be received by a light receiving unit of said photo coupler while said blades of said cooling fan move during the rotation of said cooling fan, said pulses being representative of said operating state of said cooling fan.

3. The apparatus as claimed in claim 2, wherein said light emitting unit comprises a photo diode, and said light receiving unit comprises a photo transistor.

4. The apparatus as claimed in claim 1, wherein said per revolution pulse generating means comprises:

a latch for receiving input signals in accordance with clock signals provided to a clock terminal of said latch, and for providing output signals through output terminals of said latch;

a counter for generating and providing output of said pulse signal each time said output signals provided from said output terminals of said latch represent a count value equal to a number of said pulses provided to a clock terminal of said counter from said pulse generating means; and an AND gate having a first input terminal for receiving reset signals and a second input terminal connected to a ripple counter terminal of said counter, said AND gate having an output terminal connected to a pre-load terminal of said counter.

5. The apparatus as claimed in claim 1, wherein said dividing counter means comprises:

a latch having an input terminal for receiving said input signals and output terminals for providing output of said input signals; and a counter having input terminals connected to receive said input signals from said latch, a clock terminal for receiving said reference clock signals, and an output terminal for providing output of said signals having said predetermined period.

6. The apparatus as claimed in claim 5, wherein said counter comprises a programmable dividing counter for dividing said reference clock signals by said input signals provided from said latch to generate said signals having said predetermined period.

7. The apparatus as claimed in claim 1, wherein said revolution state determining means comprises:

a first section connected to said dividing counter means for receiving said signals having said predetermined period from said dividing counter means, and setting said unit time period for determining said operating state of said cooling fan; and a second section for determining said operating state of said cooling fan during said unit time period set by said first section.

8. The apparatus as claimed in claim 7, wherein said first section of said revolution state determining means comprises:

first logic multiplying means having a first input terminal connected to receive reset signals, and a second input terminal connected to receive said signals having said predetermined period from said dividing counter means;

inverting means having an input terminal connected to receive said signals having said predetermined period from said dividing counter means;

second logic multiplying means having a first input terminal connected to an output terminal of said first logic multiplying means;

third logic multiplying means having a first input terminal connected to receive said reset signals, and a second input terminal connected to an output terminal of said inverting means;

fourth logic multiplying means having a first input terminal connected to receive said reset signals, and a second input terminal connected to said output terminal of said inverting means;

first logic adding means having first, second and third input terminals connected to output terminals of said second, third and fourth logic multiplying means, respectively;

first delaying means having an input terminal connected to said output terminal of said first logic multiplying means, a clock terminal connected to receive clock signals, and an inverting output terminal connected to a third input terminal of said fourth logic multiplying means;

second delaying means having an input terminal connected to an output terminal of said first logic adding means, a clock terminal connected to receive said clock signals, an output terminal connected to a second input terminal of said second logic multiplying means, and an inverting output terminal connected to a third input terminal of said third logic multiplying means; and second logic adding means having an input terminal connected to said inverting output terminals of said first and second delaying means, and an output terminal for providing output of timing signals defining said unit time period.

9. The apparatus as claimed in claim 7, wherein said second section of said revolution state determining means comprises:

first logic multiplying means having a first input terminal connected to receive reset signals, and a second input terminal connected to receive timing signals defining said unit time period from said first section of said revolution state determining means;

first inverting means having an input terminal connected to receive said timing signals defining said unit time period from said first section of said revolution state determining means;

second inverting means having an input terminal connected to receive said pulse signal from said per revolution pulse generating means;

second logic multiplying means having a first input terminal connected to receive said reset signals, and second and third input terminals connected to output terminals of said first and second inverting means, respectively;

first logic adding means having a first input terminal connected to an output terminal of said second logic multiplying means;

first delaying means having an input terminal connected to an output terminal of said first logic adding means, and a clock terminal for receiving clock signals;

third logic multiplying means having a first input terminal connected to receive said reset signals, a second input terminal connected to said output terminal of said first inverting means, a third input terminal connected to receive said pulse signal from said per revolution pulse generating means, and a fourth input terminal connected to an inverting output terminal of said first delaying means;

fourth logic multiplying means having a first input terminal connected to an output terminal of said first delaying means;

fifth logic multiplying means having a first input terminal connected to said inverting output terminal of said first delaying means;

second logic adding means having first and second input terminals connected to output terminals of said fourth and fifth logic multiplying means, respectively;

sixth logic multiplying means having a first input terminal connected to an output terminal of said second logic adding means, and a second input terminal connected to an output terminal of said first logic multiplying means;

third logic adding means having a first input terminal connected to an output terminal of said sixth logic multiplying means, and a second input terminal connected to an output terminal of said third logic multiplying means;

second delaying means having an input terminal connected to an output terminal of said third logic adding means, a clock terminal for receiving said clock signals, an output terminal connected to a second input terminal of said fifth logic multiplying means, and an inverting output terminal connected to a second input terminal of said fourth logic multiplying means and to a fourth input terminal of said second logic multiplying means; and seventh logic multiplying means having first and second input terminals connected to said output terminals of said first and second delaying means, respectively, and an output terminal for outputting said interrupt signal.

10. An apparatus for determining an operating state of a cooling fan in a computer system, said apparatus comprising:

first means for generating a pulse signal for each revolution of said cooling fan as said cooling fan rotates to expel heat generated by said computer system;

second means for generating signals having a predetermined period;

third means for setting a unit time period for determining said operating state of said cooling fan in accordance with said signals generated by said second means; and fourth means for determining said operating state of said cooling fan based on outputs of said pulse signal provided from said first means during said unit time period, and generating an interrupt signal to prevent further operation of said computer system when said operating state of said cooling fan is determined to be abnormal.

11. The apparatus as claimed in claim 10, wherein said first means comprises:

a photo coupler having a light emitting unit and a light receiving unit, said photo coupler generating and providing output of pulses based on whether blades of said cooling fan allow light rays emitted from said light emitting unit to be received by said light receiving unit while said blades of said cooling fan move during rotation of said cooling fan; and a counter for receiving said pulses output from said photo coupler and generating said pulse signal for each revolution of said cooling fan in dependence upon said pulses.

12. The apparatus as claimed in claim 11, wherein said light emitting unit comprises a photo diode, and said light receiving unit comprises a photo transistor.

13. The apparatus as claimed in claim 10, wherein said second means comprises:

a latch having an input terminal for receiving input signals and output terminals for providing output of said input signals; and a counter having input terminals connected to receive said input signals from said latch, a clock terminal for receiving reference clock signals, and an output terminal for providing output of said signals having said predetermined period.

14. The apparatus as claimed in claim 13, wherein said counter comprises a programmable dividing counter for dividing said reference clock signals by said input signals provided from said latch to generate said signals having said predetermined period.

15. A method for determining an operating state of a cooling fan in a computer system, comprising the steps of:

generating first pulses corresponding to a rotating speed of said cooling fan as said cooling fan rotates to expel heat generated by said computer system;

receiving said first pulses and generating second pulses in dependence upon said first pulses, each one of said second pulses representing one revolution of said cooling fan;

generating signals having a predetermined period and setting a unit time period for determining said operating state of said cooling fan in accordance with said signals; and determining said operating state of said cooling fan based on outputs of said second pulses during said unit time period.

16. The method as claimed in claim 15, further comprising a step of:

generating an interrupt signal to prevent further operation of said computer system when said operating state of said cooling fan is abnormal.

* * * * *